United States Patent
Harper et al.

(10) Patent No.: US 6,985,464 B2
(45) Date of Patent: Jan. 10, 2006

(54) MANAGING PACKET DATA INTERCONNECTIONS IN MOBILE COMMUNICATIONS

(75) Inventors: Matthew Hayden Harper, Salem, NH (US); Janakiraman Senthilnathan, Chelmsford, MA (US)

(73) Assignee: Starent Networks Corporation, Tewksbury, MA (US)

( * ) Notice: Subject to any disclaimer, the term of this patent is extended or adjusted under 35 U.S.C. 154(b) by 860 days.

(21) Appl. No.: 09/919,334

(22) Filed: Jul. 30, 2001

(65) Prior Publication Data

US 2003/0021252 A1 Jan. 30, 2003

(51) Int. Cl.
*H04Q 7/00* (2006.01)
*H04Q 7/20* (2006.01)
*H04L 12/28* (2006.01)

(52) U.S. Cl. .................. 370/331; 370/400; 455/436
(58) Field of Classification Search ................ 370/355, 370/331, 400, 349, 338; 455/445, 436
See application file for complete search history.

(56) References Cited

U.S. PATENT DOCUMENTS

| | | | |
|---|---|---|---|
| 6,834,050 B1 * | 12/2004 | Madour et al. ............. | 370/392 |
| 2002/0021681 A1 * | 2/2002 | Madour ....................... | 370/331 |
| 2002/0114293 A1 * | 8/2002 | Madour et al. ............. | 370/329 |
| 2005/0025116 A1 * | 2/2005 | Chen et al. ................. | 370/349 |

FOREIGN PATENT DOCUMENTS

| | | |
|---|---|---|
| WO | WO 99/37103 | 7/1999 |
| WO | WO 00/14981 | 3/2000 |
| WO | WO 00/41414 | 7/2000 |
| WO | WO 00/78080 | 12/2000 |
| WO | WO 01/50783 | 7/2001 |
| WO | WO 01/67786 | 9/2001 |
| WO | WO 01/78322 | 10/2001 |

\* cited by examiner

*Primary Examiner*—Hassan Kizou
*Assistant Examiner*—Brian Roberts
(74) *Attorney, Agent, or Firm*—Wilmer Cutler Pickering Hale and Dorr LLP (57) ABSTRACT

Data interconnections are managed in a mobile communications network having multiple packet control function entities (PCFs) and multiple packet data serving nodes (PDSNs), wherein each PCF and PDSN communicates signaling messages according to a mobile signaling protocol. Information for a Mobile Subscriber (MS) is received. The MS is associated with a same one of the PDSNs when the MS moves from a first area covered by a first PCF to a second area covered by a second PCF. It is determined that a first PCF has issued a first connection request on behalf of an MS. As a result of the first connection request, a selection protocol is executed a first time to select a PDSN that corresponds to the MS. It is determined that a second PCF has issued a second connection request on behalf of the MS. The selection protocol is executed a second time to select the same PDSN that was selected as a result of the first connection request.

19 Claims, 7 Drawing Sheets

MANAGING PACKET DATA INTERCONNECTIONS IN MOBILE COMMUNICATIONS

BACKGROUND

This invention relates to mobile communications and, more particularly, to managing packet data interconnections in a mobile communication network.

Figure 1:
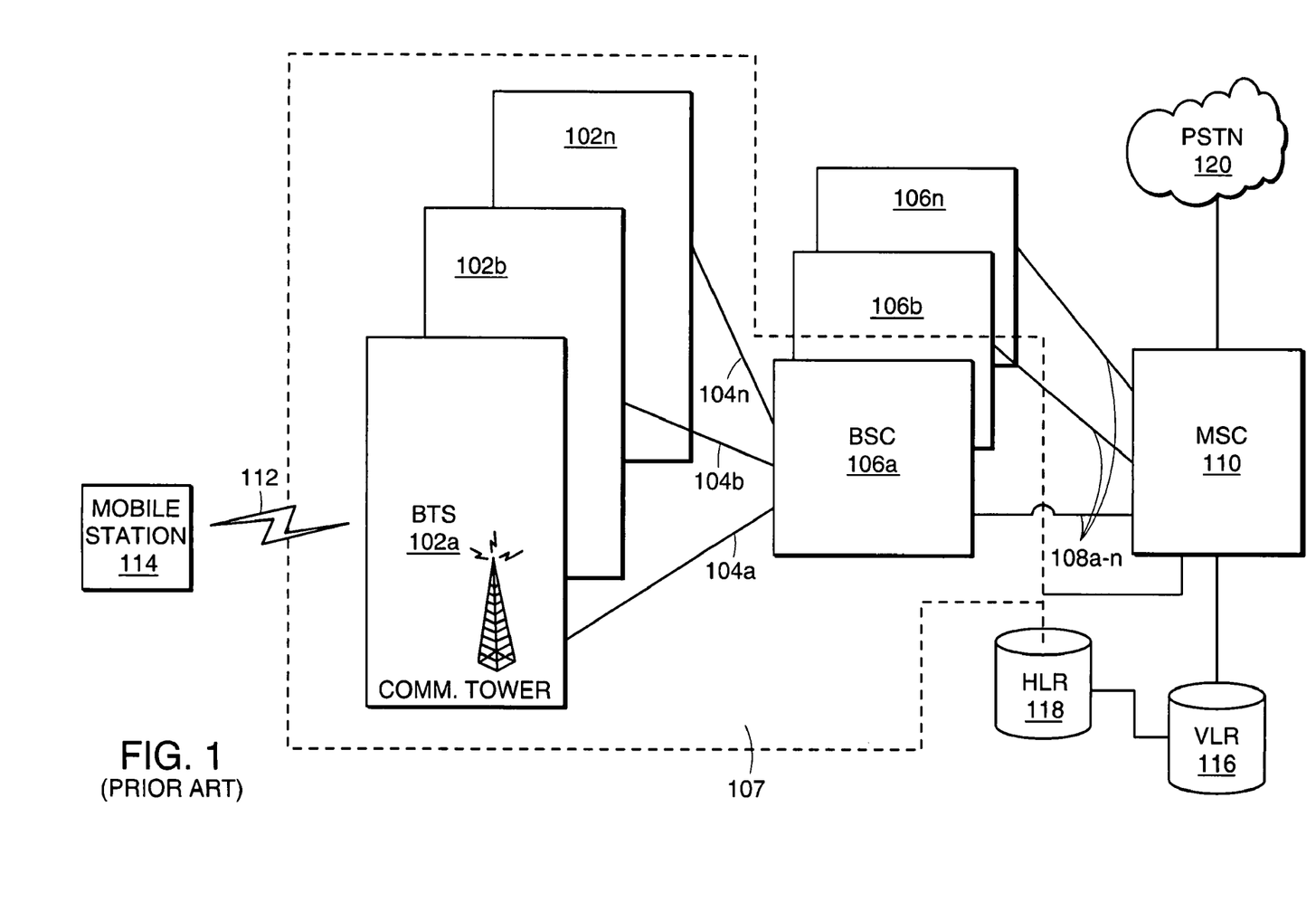
FIGS. 1–3 are illustrations of a prior art mobile communications system.

All modern mobile communication systems have a hierarchical arrangement, in which a geographical "coverage area" is partitioned into a number of smaller geographical areas called "cells." Referring to FIG. 1, each cell is preferably served by a Base Transceiver Station ("BTS") 102a. Several BTS 102a–n are centrally administered via fixed links 104a–n by a Base Station Controller ("BSC") 106a. The BTSs and BSC are sometimes collectively referred to as the Base Station Subsystem ("BS") 107. Several BSCs 106b–n may be centrally administered by a Mobile Switching Center ("MSC") 110 via fixed links 108a–n.

MSC 110 acts as a local switching exchange (with additional features to handle mobility management requirements, discussed below) and communicates with the phone network ("PSTN") 120 through trunk groups. U.S. mobile networks include a home MSC and a Gateway MSC. The home MSC is the MSC corresponding to the exchange associated with a Mobile Subscriber (also referred to as a Mobile Station or "MS"); this association is based on the phone number, such as the area code, of the MS. Examples of an MS include a hand-held device such as a mobile phone, a PDA, a 2-way pager, or a laptop computer, or Mobile Unit Equipment such as equipment that is not self-propelled and that does not have an operator, such as a mobile unit attached to a refrigerator van or a rail car, a container, or a trailer.

The home MSC is responsible for a Home Location Register ("HLR") 118 discussed below. The Gateway MSC, on the other hand, is the exchange used to connect the MS call to the PSTN. Consequently, sometimes the home MSC and Gateway MSC functions are served by the same entity, but other times they are not (such as when the MS is roaming). Typically, a Visiting Location Register ("VLR") 116 is co-located with the MSC 110 and a logically singular HLR is used in the mobile network (a logically singular HLR may be physically distributed but is treated as a single entity). As will be explained below, the HLR and VLR are used for storing subscriber information and profiles.

Radio channels 112 are associated with the entire coverage area. The radio channels are partitioned into groups of channels allocated to individual cells. The channels are used to carry signaling information to establish call connections and related arrangements, and to carry voice or data information once a call connection is established.

Mobile network signaling involves at least two main aspects. One aspect involves the signaling between an MS and the rest of the network. In the case of 2G ("2G" is the industry term used for "second generation") and later technology, this signaling concerns access methods used by the MS (such as time-division multiple access, or TDMA; code-division multiple access, or CDMA), pertaining to, for example, assignment of radio channels and authentication. A second aspect involves the signaling among the various entities in the mobile network, such as the signaling among the MSCs, BSCs, VLRs, and HLRs. This second part is sometimes referred to as the Mobile Application Part ("MAP") especially when used in the context of Signaling System No. 7 ("SS7"). SS7 is a common channel signaling system by which elements of the telephone network exchange information, in the form of messages.

The various forms of signaling (as well as the data and voice communication) are transmitted and received in accordance with various standards. For example, the Electronics Industries Association ("EIA") and Telecommunications Industry Association ("TIA") help define many U.S. standards, such as IS-41, which is a MAP standard. Analogously, the CCITT and ITU help define international standards, such as GSM-MAP, which is an international MAP standard. Information about these standards is well known and may be found from the relevant organizing bodies as well as in the literature, see, e.g., Bosse, SIGNALING IN TELECOMMUNICATIONS NETWORKS (Wiley 1998).

To deliver a call from an MS 114, a user dials the number and presses "send" on a cell phone or other MS. The MS 114 sends the dialed number indicating the service requested to the MSC 110 via the BS 107. The MSC 110 checks with an associated VLR 116 (described below) to determine if the MS 114 is allowed the requested service. The Gateway MSC routes the call to the local exchange of the dialed user on the PSTN 120. The local exchange alerts the called user terminal, and an answer back signal is routed back to the MS 114 through the serving MSC 110 which then completes the speech path to the MS. Once the setup is completed the call may proceed.

To deliver a call to an MS 114, (assuming that the call originates from the PSTN 120) the PSTN user dials the MS's associated phone number. At least according to U.S. standards, the PSTN 120 routes the call to the MS's home MSC (which may or may not be the one serving the MS). The MSC then interrogates the HLR 118 to determine which MSC is currently serving the MS. This also acts to inform the serving MSC that a call is forthcoming. The home MSC then routes the call to the serving MSC. The serving MSC pages the MS via the appropriate BS. The MS responds and the appropriate signaling links are setup.

During a call, the BS 107 and MS 114 may cooperate to change channels or BTSs 102, if needed, for example, because of signal conditions. These changes are known as "handoffs," and they involve their own types of known messages and signaling.

One aspect of MAP involves "mobility management." Different BSs and MSCs may be needed and used to serve an MS, as the MS 114 roams to different locations. Mobility management helps to ensure that the Gateway MSC has the subscriber profile and other information the MSC needs to service (and bill) calls correctly. To this end, MSCs use VLR 116 and HLR 118. The HLR is used to store and retrieve the mobile identification number ("MIN"), the electronic serial number ("ESN"), MS status, and the MS service profile, among other things. The VLR stores similar information in addition to storing an MSC identification that identifies the Gateway (Home) MSC. In addition, under appropriate MAP protocols, location update procedures (or registration notifications) are performed so that the home MSC of a Mobile Subscriber can locate its users. These procedures are used when an MS roams from one location to another or when an MS is powered on and registers itself to access the network. For example, a location update procedure may proceed with the MS 114 sending a location update request to the VLR 116 via the BS 107 and MSC 110. The VLR 116 sends a location update message to the HLR 118 serving the MS 114, and the subscriber profile is downloaded from the HLR 118 to the VLR 116. The MS 114 is sent an acknowledgement of a successful location update. The HLR 118 requests the VLR (if any) that previously held profile data to delete the data related to the relocated MS 114.

Figure 2:
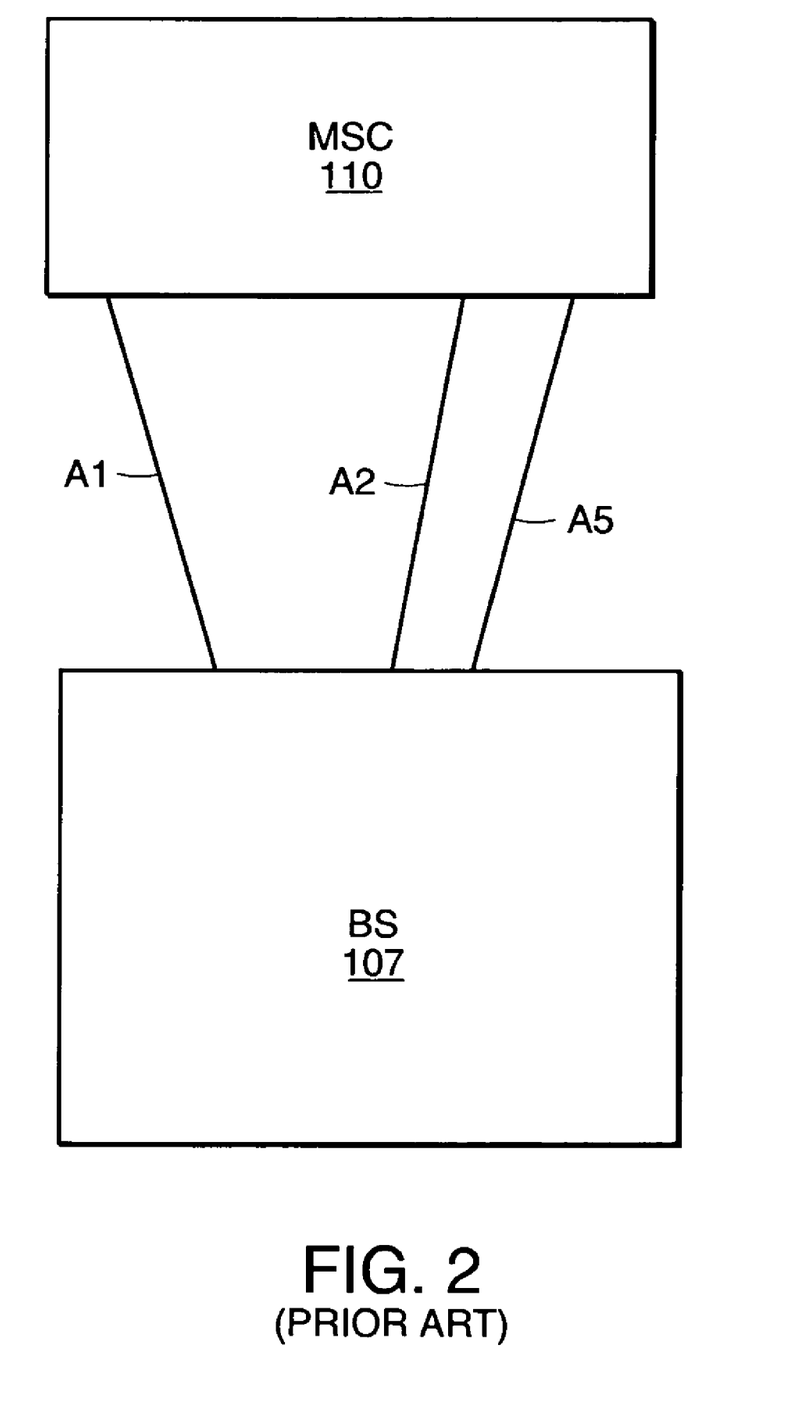

FIG. 2 shows in more detail the signaling and user traffic interfaces between a BS 107 and an MSC 110 in a CDMA mobile network. The BS 107 communicates signaling information using an SS7-based interface for controlling voice and data circuits known as the "A1" interface. An interface known as "A2" carries user traffic (such as voice signals) between the switch component 204 of the MSC and the BS 107. An interface known as "A5" is used to provide a path for user traffic for circuit-switched data calls (as opposed to voice calls) between the source BS and the MSC. Information about one or more of A1, A2, A5 may be found in CDMA Internetworking-Deploying the Open-A Interface, Su-Lin Low, Ron Schneider, Prentice Hall, 2000, ISBN 0-13-088922-9.

Figure 3:
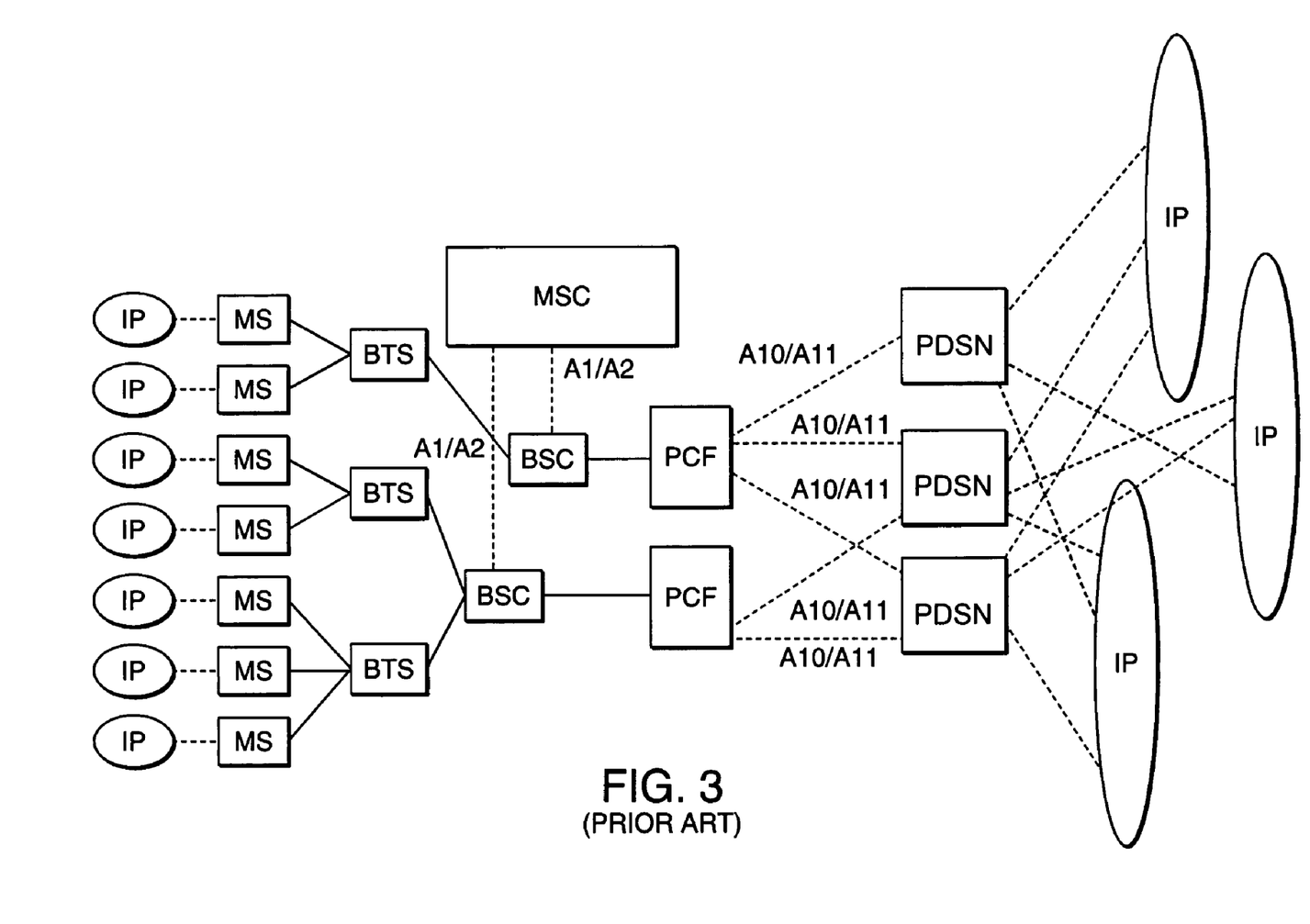

With reference to FIG. 3, wireless services include data services such as "packet data calls" between the MS and the Internet, such as data calls in accordance with the CDMA 2000 standard. In the case of an MS known as a 3G device, a data call from the MS is routed from a 3G-capable BSC to a mechanism known as a Packet Data Serving Node (PDSN). The PDSN interfaces between the transmission of the data in the fixed network and the transmission of the data over the air interface. The PDSN interfaces to the BS through a Packet Control Function (PCF), which may or may not be co-located with the BS.

A wireless packet R-P interface is provided between PCF and PDSN and implements protocol conversation between the wireless channel and the wire channel. The R-P interface is based on "A10" and "A11" aspects of the A interface, as described in 3rd Generation Partnership Project 2 "3GPP2"-3GPP2.A-S0001-0.1 June 2000. The A10 interface (also known as a GRE tunnel) provides a data transport protocol between the PCF and the PDSN. The A11 interface provides control signaling for data flow between a PCF and a PDSN.

Two modes of operation are typically offered by a PDSN: Simple IP and Mobile IP. Simple IP refers to a service in which the MS is assigned a dynamic IP address from the local PDSN, and is provided IP routing service to a visited access provider network. The MS may maintain its IP address as long as it is served by a radio network which has connectivity to the address assigning PDSN. There is no IP address mobility beyond this PDSN.

In particular, when a Simple IP Mobile Subscriber (MS) moves between areas served by different PCFs, that subscriber may be directed to a new PDSN. The new PDSN mandates renegotiation of all Point to Point Protocol (PPP) parameters (such as the IP address assigned to the MS) since it is unaware of the previous PPP session state. The renegotiation process is highly disruptive to data applications that may be running on the MS, often requiring the applications to terminate service. For Simple IP Mobile Subscribers, since there is no provision for a PDSN to PDSN handoff during a data call, IP connectivity cannot be maintained.

Mobile IP provides an IP layer mobility management function that maintains existing communications across PDSNs. Mobile IP requires that special capabilities be built into Mobile Subscribers. For Mobile IP Mobile Subscribers, in order to maintain IP connectivity, the Mobile Subscriber effects a PDSN to PDSN handoff by registering with its Home Agent in accordance with a well known protocol document RFC2002 (http://www.ietf.org/rfc/rfc2002.txt?number=2002). In this case, a new packet data session is established along with the PPP session. In the mobile IP model, the handoff is less disruptive, as network-layer (IP) parameters are not renegotiated. However, there can be significant delay in reestablishing a mobile IP tunnel between the PDSN Foreign Agent (FA) and the Home Agent (HA) for that user. This delay is disruptive to packets in transit to the MS. There is no similar IP layer mobility management function support between PDSNs for Simple IP service.

In Simple IP, the PDSN terminates the A10/A11 data stream and either provides a PPP tunneling service such as L2TP on the PPP payload contained within the user's A10 data stream, or it terminates the user's PPP data stream and forwards the resulting user's IP packets into a virtual private network (VPN) IP cloud corresponding to that subscriber. In the Mobile IP mode, the PDSN incorporates the Foreign Agent function described in document RFC2002. The Home Agent function described in the document is served by another device within the IP cloud.

The PCF initiates setup of an A10 connection by sending an A11-Registration Request message to a selected PDSN. (The PCF initially selects a PDSN via a mechanism that is specific to the PCF implementation. Typically, the PCF has a statically configured prioritized list of PDSN addresses.) If the selected PDSN does not accept the connection, it returns an A11-Registration Reply with a reject result code. The PDSN may return an A11-Registration Reply message with result code '88H' (Registration Denied—unknown PDSN address). When code '88H' (the same as '136' decimal) is used, an alternate PDSN address is included in the A11-Registration Reply message. The address of the alternate proposed PDSN is returned in the Home Agent field of the A11-Registration Reply message. On receipt of an A11-Registration Reply with code '88H', the PCF initiates establishment of the A10 connection with the alternate proposed PDSN by sending a new A11-Registration Request message to the alternate proposed PDSN.

A load balancing technique has been proposed in which multiple PDSNs are linked to a primary PDSN. The primary PDSN keeps track of the data call loads being handled by the other PDSNs. All A11-Registration Request messages from the PCF are received by the primary PDSN, which then uses the A11-Registration Reply message with result code '88H' to redirect the PCF to one of the other PDSNs in accordance with load balancing principles. If the MS roams to an area corresponding to a different PCF, that PCF sends a new A11-Registration Request to the primary PDSN, which may cause the MS to be associated with a different PDSN, with disruptive consequences as described above.

SUMMARY

Data interconnections are managed in a mobile communications network having multiple packet control function entities (PCFs) and multiple packet data serving nodes (PDSNs), wherein each PCF and PDSN communicates signaling messages according to a mobile signaling protocol. In an aspect of the invention, information for a Mobile Subscriber (MS) is received, and the MS is associated with a same one of the PDSNs when the MS moves from a first area covered by a first PCF to a second area covered by a second PCF.

In another aspect of the invention, it is determined that a first PCF has issued a first connection request on behalf of an MS. As a result of the first connection request, a selection protocol is executed a first time to select a PDSN that corresponds to the MS. It is determined that a second PCF has issued a second connection request on behalf of the MS.

The selection protocol is executed a second time to select the same PDSN that was selected as a result of the first connection request.

In another aspect of the invention, a list of the PDSNs is maintained. A hashing protocol is executed to map a number derived from an MS identification number onto the list of PDSNs. A result is derived from the mapping. The result is included in a response to a connection request from one of the PCFs.

In another aspect of the invention, it is determined that a first one of the PCFs has issued a first connection request on behalf of a Mobile Subscriber (MS), and, by an entity other than one of the PCFs or one of the PDSNs, it is determined whether to execute a selection protocol to select, from among the PDSNs, a PDSN that corresponds to the MS.

In another aspect of the invention, it is determined that one of the PCFs has issued a connection request on behalf of a Mobile Subscriber (MS), and a response is caused to be issued back to the PCF directing the PCF to issue a connection request to a service address of one of the PDSNs, the one of the PDSNs also having a redirection address.

Implementations of the invention may provide one or more of the following advantages. During a data call, inter-PDSN handoffs can be reduced or avoided. A PPP connection between a Mobile Subscriber (such as a mobile handset) and a PDSN can be maintained when the Mobile Subscriber roams outside an area covered by one BSC or PCF and into an area covered by another BSC or PCF. Accordingly, with respect to applications that depend on the maintenance of the PPP connection, disruptions can be reduced or eliminated. The PPP connection can be maintained regardless of whether the Mobile Subscriber is compatible with mobile IP. Applications that are compatible with Simple IP and standard handsets can maintain data call integrity even when the Mobile Subscriber roams among areas covered by different BSCs or PCFs. With mobile IP, interface PDSN handoffs can be reduced or eliminated, which helps to reduce handoff latency. Each PDSN can redirect calls to other PDSNs properly without tracking the calls being handled by the other PDSNs.

Other advantages and features will become apparent from the following description, including the drawings, and from the claims.

DETAILED DESCRIPTION

A method and a system are provided for managing packet data interconnections in mobile communications. The method and system help to avoid a PDSN handoff in MS data communications when an MS moves between areas associated with different PCFs.

In a first general approach, each MS has a permanently assigned PDSN. The PCF obtains this address (and backup addresses) from the Home Location Register (HLR) for a Mobile Subscriber when the subscriber registers and authenticates with the network. In such a case, all of the network providers interconnect the IP radio networks between all PCFs and PDSNs regardless of geographical or administrative concerns/boundaries. Changes are made to the HLR and to the messaging between the BSC/MSC (HLR proxy) and the PCF. A static mapping between Mobile Subscribers and available PDSNs is maintained. The HLR may also identify a backup PDSN address for each MS in case the primary PDSN for an MS is not available.

In a second general approach, an administratively cooperative group of PCFs use a signaling scheme among themselves to identify an appropriate PDSN to service each A10/A11 Mobile Subscriber session. A large amount of per session storage and complex signaling is involved; each PCF is aware of every currently established MS session within an administrative domain. In a simplification, each PCF within an administrative domain is configured with a complete list of available PDSNs and each PCF applies the same or effectively the same hashing function that maps mobile session identification information onto the list of PDSNs. Information that may be used to identify a potential mobile session includes the following "three number set": MN Type, MN ID, and MN Session Reference ID. In a specific implementation, each PCF selects the primary PDSN to terminate a MS session by hashing the three number set onto the list of PDSNs and first offering the session to the selected PDSN; if the session is not accepted by the selected primary PDSN, any other available PDSN can be used (the PCF may give a preference to a PDSN suggested by the original PDSN that did not accept the offered session). In such a case, non-overlapping administrative PCF areas are defined, and it may be necessary to address how to handle taking PDSNs in and out of service, and how to handle dynamic load balancing with a lack of feedback from PDSNs. An inter-PCF signaling protocol may be used, or new PCF-PDSN signaling messages may be provided so that the PCF has access to information available only within the PDSN, such as user profile and PDSN administrative state information, which may be needed or helpful.

In a third general approach, described in more detail below, existing capabilities of PCFs are used by enhanced PDSN software to allow the PDSN software to help avoid inter-PDSN handoffs. In particular, in a specific implementation, the R-P Registration Request Error code 0x 88 (indicating "Registration Denied==administratively denied"), is used by the enhanced PDSN software to help avoid PDSN handoffs. When this error code is returned by the PDSN in response to the PCF issuing a registration request, the PDSN may suggest another PDSN to try instead of itself. Using this mechanism, the PDSN can suggest a specific PDSN to terminate a session for a Mobile Subscriber. A variety of techniques are described below for selecting a specific PDSN to suggest to a PCF performing a registration request. The techniques allow an ongoing data call that has changed PCFs to continue to be directed to the same PDSN, which helps to avoid PDSN handoffs.

A first technique for selecting a specific PDSN to suggest to a PCF includes configuring each PDSN with two addresses (also known as ports): an R-P redirection address and an R-P service address. The PCFs are configured only with the addresses that correspond to R-P redirection addresses. When a PCF contacts the PDSN for the first time, the PDSN selects the specific PDSN to handle the new session for the Mobile Subscriber based on the three number set (MN Type, MN ID, and MN Session Reference ID). The three numbers are used in a PDSN selection procedure to select an "optimal" PDSN. The PDSN selection procedure may be or include a hashing function to a preconfigured (or discovered) list of PDSN service addresses. An example follows:

Two PDSNs are provided:

PDSN-A, configured with service address 10.1.1.11 and with redirection address 10.1.1.2

PDSN-B, configured with service address 10.2.2.1 and with redirection address 10.2.2.2

Both PDSNs are configured with a PDSN service address list as follows: (10.1.1.1, 10.2.2.1). Both PDSNs are provided with a hashing function:

H(mn-type,mn-id,mn-session-id)=(mn-type+nm-id+nm-session-id) mod 2

The hashing function computes an index into the PDSN service address list (an index of 0 corresponds to 10.1.1.1; an index of 1 corresponds to 10.2.2.1).

A PCF is configured with the following list of PDSN addresses: (10.1.1.2, 10.2.2.2).

A call for MS #1 comes in, having the following characteristics:

MN-TYPE=1
MN ID=978851110
MN Session Reference ID=1

The PCF sends an R-P registration request to the first PDSN in its list: PDSN-A (10.1.1.2). PDSN-A computes H(1,978851110,1)=0, which indicates that the service address for the call is to be 10.1.1.1. The service address 10.1.1.1 represents PDSN-A itself, which therefore accepts the call.

A call for MS #2 comes in, having the following characteristics:

MN-TYPE=1
MN ID=978851111
MN Session Reference ID=1

The PCF sends an R-P registration request to the first PDSN in its list: PDSN-A (10.1.1.2). PDSN-A computes H(1,978851111,1)=1, which indicates that the service address for the call is to be 10.2.2.1. Since the service address 10.2.2.1 does not correspond to PDSN-A, a registration reject message with error code 0x88 is sent back to the PCF with the Home Agent field of the message set to 10.2.2.1. The PCF sends a new registration request to PDSN-B 10.2.2.1. Since the request is sent to the service address, PDSN-B does not execute the hashing function; instead, PDSN-B starts R-P service if sufficient resources are available.

Figure 4:
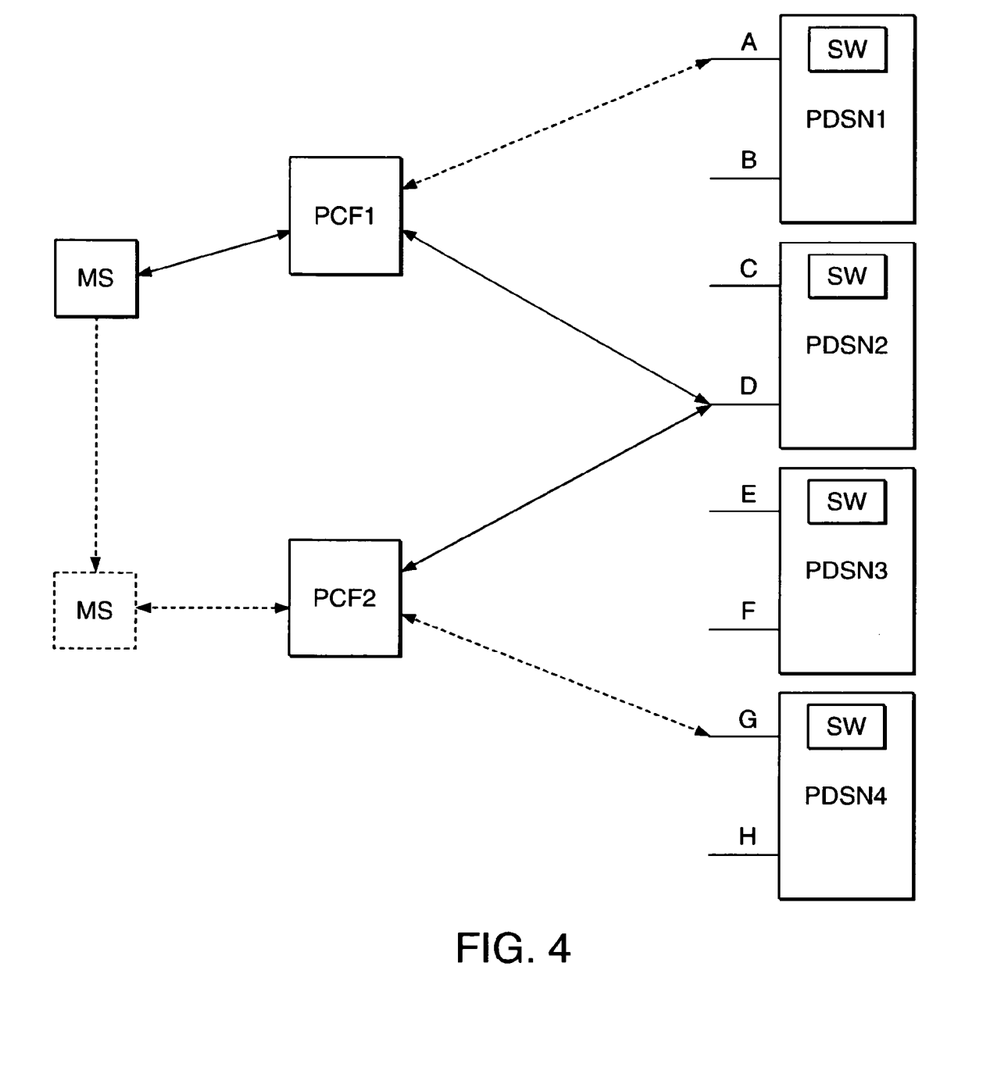
FIG. 4 is a block diagram of elements of a system for managing packet data interconnections.
Figure 5:
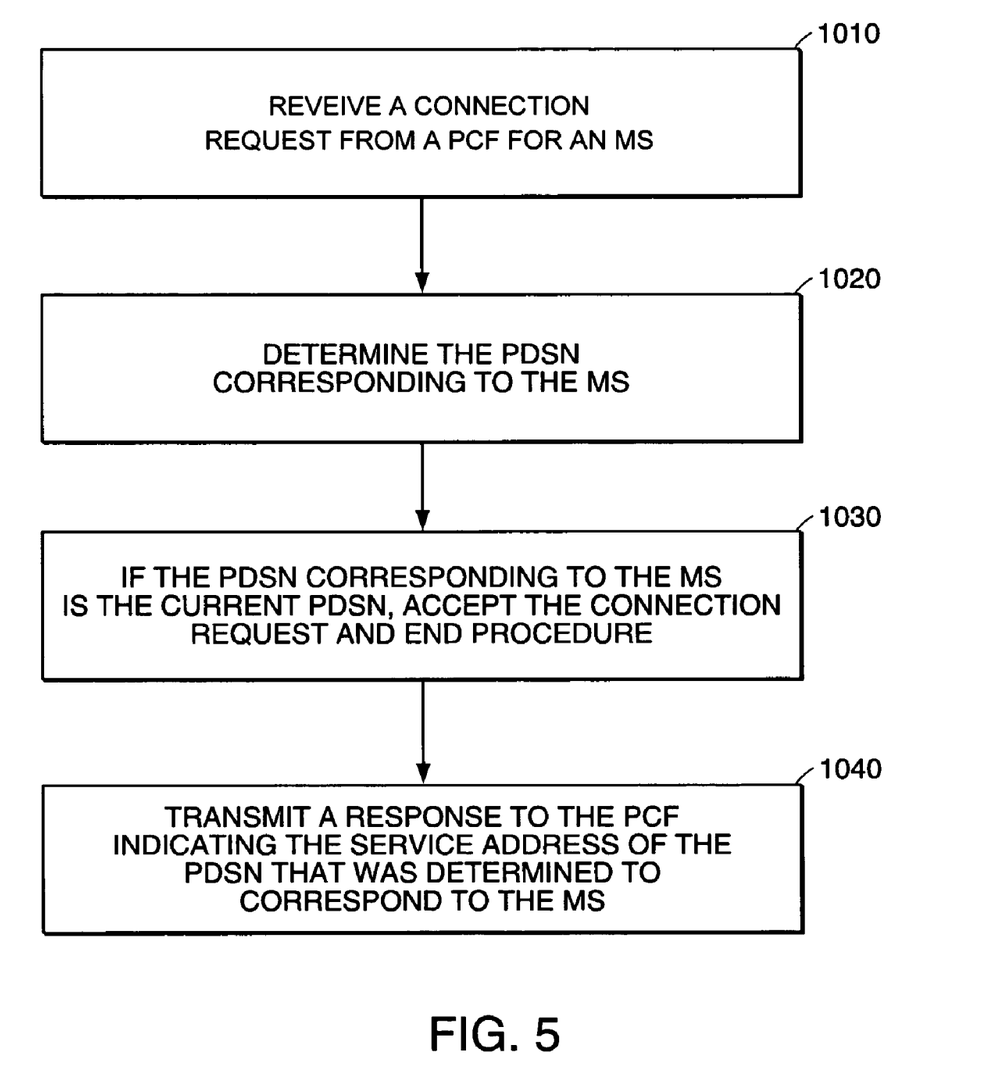
FIGS. 5–8 are flow diagrams of procedures executable by one or more of the systems of FIGS. 1–4.

An example procedure is illustrated in FIGS. 4–5. (For simplicity, FIG. 4 does not show the elements between the MS and the PCF shown in FIG. 3.) Each of PDSNs PDSN1, PDSN2, PDSN3, PDSN4 has an R-P redirection address and an R-P service address (such as, in the case of PDSN1, address A and address B, respectively). PCF1 and PCF2 are configured to use only the R-P redirection addresses for initial contact with the PDSNs. Each PDSN runs software SW that operates as now described. Initially, MS is in an area covered by PCF1. When a data call involving MS is initiated, PDSN1 receives a connection request (an A11-Registration Request message) from PCF1 at PDSN1 address A (step 1010). The PDSN corresponding to MS (PDSN2 in this example) is determined (step 1020). If the PDSN corresponding to MS is the current PDSN (in this example, if the corresponding PDSN were PDSN1), the connection request is accepted and the procedure ends (step 1030). A response (an A11-Registration Reply with a reject result code '88H') is transmitted to PCF1 indicating the R-P service address (here, address D) of the corresponding PDSN. (step 1040).

If MS roams to the area served by PCF2, PCF2 sends a connection request to one of the PDSNs (here, PDSN4, at address G). Software SW on PDSN4 determines, as the same software SW on PDSN1 did above, that the PDSN corresponding to MS is PDSN2, and responds to PCF2 indicating a redirection to address D of PDSN2. Thus, MS remains associated with PDSN2 despite having moved from an area served by PCF1 to an area served by PCF2.

In at least two ways, the arrangement described above helps to reduce or prevent unnecessary redirection communications between the PCFs and the PDSNs. First, by accepting a connection request when the PDSN corresponding to MS is the current PDSN, the software SW avoids causing the PCF to redirect the request back to the same PDSN. Second, by providing for separate redirection and service addresses on each PDSN, the software SW can be enhanced to detect when a request is the result of a redirection, and thereby avoid causing the PCF to perform another redirection, back to the same PDSN. According to the enhancement, since the PCFs are configured with the redirection addresses only, when a request comes into the PDSN via the service address instead of the redirection address, the software SW accepts the request without further analysis, because it is assumed that the PCF generates a request to the service address only as a result of a redirection response.

Figure 6:
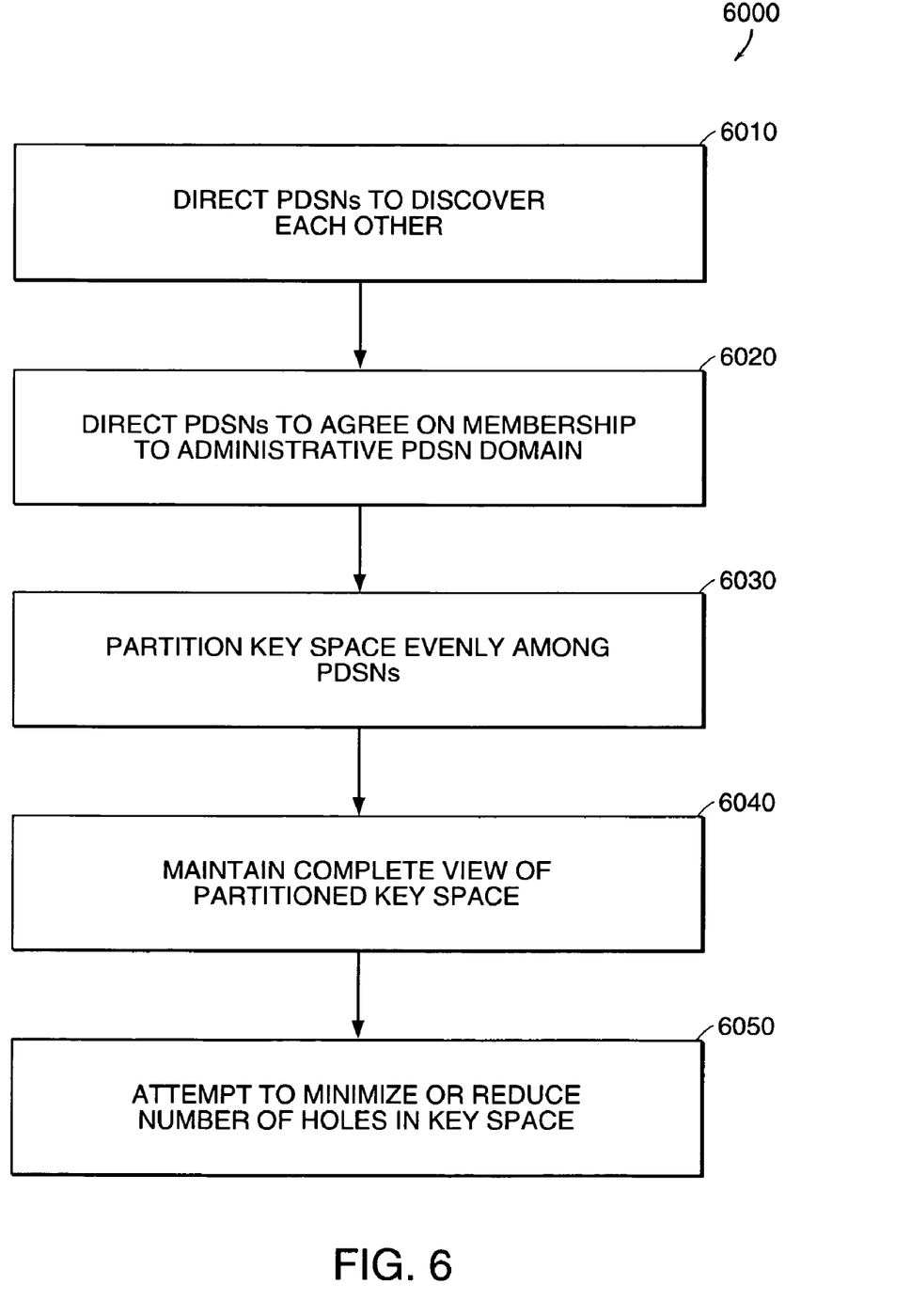

An alternative PDSN selection procedure includes dynamic management of the key-space generated by the hashing function. The following is a description of a procedure 6000 (FIG. 6) suitable for the dynamic management of key space. A key space may consist of a finite integral range 0.N. This key space may correspond directly to the three number set (MN Type, MN ID, and MN Session Reference ID) or to the result of a hash function applied to the three number set. First, the PDSNs within a domain are directed to discover each other (step 6010) and agree on membership to the administrative PDSN domain (step 6020). Next, the key space is evenly partitioned among the operationally active PDSNs within the administrative domain (step 6030), keeping intact any active sessions. Each PDSN maintains a complete view of the partitioned key space (step 6040) and attempts to minimize or reduce the number of holes in the space (step 6050) by acquiring key space from peers as sessions are added locally. An example follows:

Two PDSNs are provided:

PDSN-A, configured with service address 10.1.1.1 and with redirection address 10.1.1.2.

PDSN-B, configured with service address 10.2.2.1 and with redirection address 10.2.2.2.

Both PDSNs are configured with an available PDSN service address list (10.1.1.1, 10.2.2.1), a PDSN service list having 65536 entries (10.1.1.1 <repeats 32768 times>, 10.2.2.1 <repeats 32768 times>), and a hashing function H(mn-type,mn-id,mn-session-id)=(mn-type+nm-id+nm-session-id) mod 65536.

The hashing function computes an index into the 65536 entry PDSN service list.

To join the existing two PDSNs, another PDSN solicits a list of free entries from each PDSN, intersects the lists, and asserts ownership of unused slots by sending an request ownership message to each PDSN. After receiving a positive acknowledgement from each PDSN, the other PDSN may send an assert ownership message to each PDSN.

Figure 7:
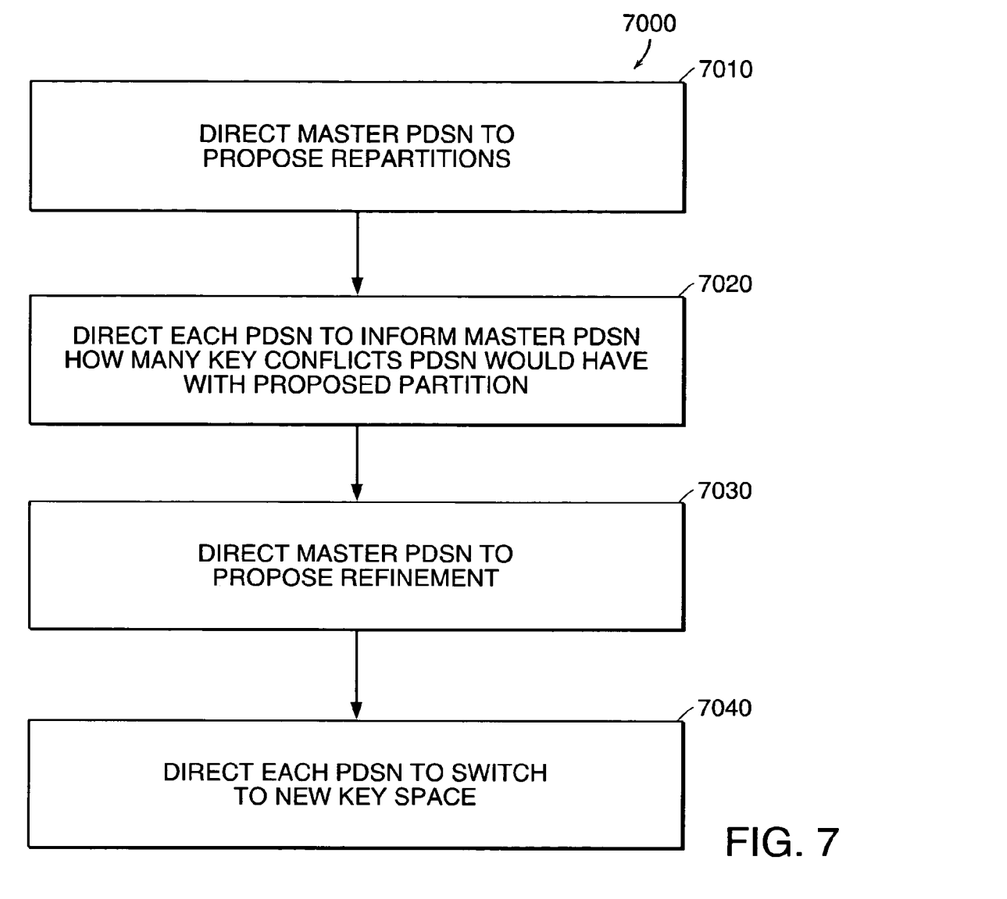

As PDSNs are added or removed or added and removed, and as load changes, it may be necessary or helpful to re-partition the key space dynamically among the PDSNs. In a specific implementation, such re-partitioning is performed in a centralized fashion by a procedure 7000 (FIG. 7) as follows. A designated "master" PDSN is directed to propose various repartitions of the key space (step 7010). In such a case, each PDSN informs the master PDSN how many key conflicts the PDSN would have with a proposed partition (step 7020) and, depending on the circumstances, the master PDSN proposes further refinements of the key space (step 7030) by further splitting contentious key ranges. When an acceptable repartition of the key space is reached, each PDSN switches to the new key space (step 7040). It is desirable to avoid unresolved key conflicts, which may result in failure to achieve transparent inter-PDSN mobility in the simple IP case.

Figure 8:
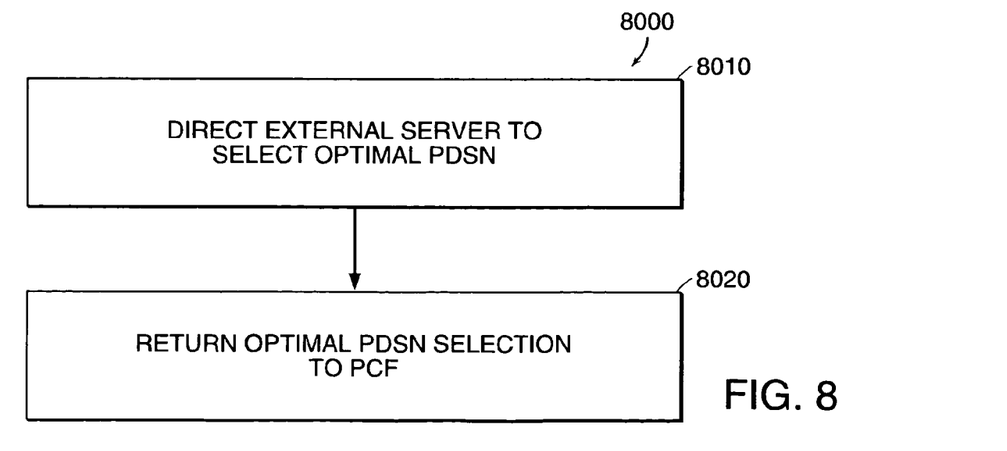

A second technique for selecting a specific PDSN to suggest to a PCF shares some aspects with the first technique. In this case, according to a procedure 8000 (FIG. 8), an external server such as a Remote Authentication Dial-In User Service (RADIUS) server is used to select an "optimal" PDSN to handle an R-P session (step 8010), and return the "optimal" PDSN selection back to the PCF (step 8020). An advantage is that this technique takes advantage of the existing radio resource records that identify the last PDSN that handled a session corresponding to a particular three number set (MN Type, MN ID, and MN Session Reference ID). An external server may also provide load balancing services or map specific users to specific PDSNs.

The technique (including one or more of the procedures described above) may be implemented in hardware or software, or a combination of both. In at least some cases, it is advantageous if the technique is implemented in computer programs executing on one or more programmable computers, such as a line-card or a control processor of a PDSN or a PCF, or a RADIUS server, HLR, or VLR running on a general purpose computer, or a computer running or able to run Microsoft Windows 95, 98, 2000, Millennium Edition, NT, XP; Unix; Linux; or MacOS; that each include a processor such as an Intel Pentium 4, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as a display screen of the computer.

In at least some cases, it is advantageous if each program is implemented in a high level procedural or object-oriented programming language such as C, C++, Java, or Perl to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or magnetic diskette, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, one or more of the actions performed by the software SW may be performed by another entity, such as the PCF or the MSC. In such a case, the other entity may determine the PDSN corresponding to the MS.

What is claimed is:

1. A method for use in managing data interconnections in a mobile communications network having multiple packet control function entities (PCFs) and multiple packet data serving nodes (PDSNs), wherein each PCF and PDSN communicates signaling messages according to a mobile signaling protocol, the method comprising:
   receiving information for a Mobile Subscriber (MS);
   associating the MS with a selected one of the PDSNs when the MS is in a first area covered by a first PCF; and
   associating the MS with the same selected one of the PDSNs, based on a selection made by one of the PDSNs, when the MS moves from the first area covered by the first PCF to a second area covered by a second PCF.

2. The method of claim 1, further comprising
   executing, by one of the PDSNs, a selection protocol to make the second selection.

3. The method of claim 1, further comprising
   maintaining a PPP session that links the MS to the selected one of the PDSNs when the MS moves from the first area covered by the first PCF to the second area covered by the second PCF.

4. A method for use in managing packet data interconnections in a mobile communications network having multiple packet control function entities (PCFs) and multiple packet data serving nodes (PDSNs), wherein each PCF and PDSN communicates signaling messages according to a mobile signaling protocol, the method comprising:
   determining that a first PCF has issued a first connection request on behalf of a Mobile Subscriber (MS);
   as a result of the first connection request, executing, by one of the PDSNs, a selection protocol a first time to select a particular one of the PDSNs that corresponds to the MS;
   determining that a second PCF has issued a second connection request on behalf of the MS; and
   executing, by one of the PDSNs, the selection protocol a second time to select the same one of the PDSNs that was selected as a result of the first connection request.

5. The method of claim 4, wherein the selection protocol relies on at least one of the following values: MN Type, MN ID, MN Session Reference ID, and a value made available via the MSC, VLR, or HLR.

6. The method of claim 4, further comprising
   using at least one of the following entities to perform at least some of the determination that the first PCF has issued the first connection request on behalf of the MS: one of the PCFs, one of the PDSNs, and an external server.

7. The method of claim 4, further comprising
   using at least one of the following entities to perform at least some of the executing of the selection protocol to select the PDSN that corresponds to the MS: one of the PCFs, one of the PDSNs, and an external server.

8. The method of claim 4, further comprising
   using at least one of the following entities to perform at least some of the determination that the second PCF has issued the second connection request on behalf of the MS: one of the PCFs, one of the PDSNs, and an external server.

9. The method of claim 4, further comprising
   using at least one of the following entities to perform at least some of the executing of the selection protocol the second time to select the same PDSN: one of the PCFs, one of the PDSNs, and an external server.

10. A method for use in managing packet data interconnections in a mobile communications network having multiple packet control function entities (PCFs) and multiple packet data serving nodes (PDSNs), wherein each PCF and PDSN commumcates signaling messages according to a mobile signaling protocol, the method comprising:
maintaining a dynamic list of the PDSNs;
executing a hashing protocol by one of the PDSNs, in response to a received connection request from one of the PCFs, to map a number derived from an MS identification number onto the dynamic list of the PDSNs;
deriving a result from the mapping; and
including the result in a response to the connection request issued by the one of the PCFs.

11. A method for use in managing packet data interconnections in a mobile communications network having multiple packet control function entities (PCFs) and multiple packet data serving nodes (PDSNs), wherein each PCF and PDSN communicates signaling messages according to a mobile signaling protocol, the method comprising:
receiving, at a redirection address of a first PDSN, a connection request from a PCF on behalf of a Mobile Subscriber (MS);
determining the one of the PDSNs that corresponds to the MS; and
directing the PCF to issue a connection request to a service address of the one of the PDSNs if the one of the PDSNs is not the first PDSN, the one of the PDSNs also having a redirection address.

12. The method of claim 11, further comprising
applying a selection protocol to cause different PCFs to select the same PDSN for the same MS during a single data call.

13. The method of claim 11, further comprising
causing each PCF to cause the same PDSN to be selected multiple times for the same MS during a single data call.

14. The method of claim 11, further comprising
causing communication among the PDSNs to partition a key space among the PDSNs that corresponds to a value derived from at least one of the following: MN Type, MN ID, and MN Session Reference ID.

15. A system for use in managing data interconnections in a mobile communications network having multiple packet control function entities (PCFs) and multiple packet data serving nodes (PDSNs), wherein each PCF and PDSN communicates signaling messages according to a mobile signaling protocol, the system comprising a communications processing mechanism associating a Mobile Subscriber (MS) with a selected one of the PDSNs when the MS is in a first area covered by a first PCF, and associating the MS with the same selected one of the PDSNs, based on a selection made by one of the PDSNs, when the MS moves from the first area covered by the first PCF to a second area covered by a second PCF.

16. Computer software, residing on a computer-readable storage medium, comprising a set of instructions for use in a computer system to help cause the computer system to manage data interconnections in a mobile communications network having multiple packet control function entities (PCFs) and multiple packet data serving nodes (PDSNs), wherein each PCF and PDSN communicates signaling messages according to a mobile signaling protocol, the set of instructions causing the computer system to:
receive information for a Mobile Subscriber (MS);
associate the MS with a selected one of the PDSNs when the MS is in a first area covered by a first PCF; and
associate the MS with the same selected one of the PDSNs, based on a selection made by one of the PDSNs, when the MS moves from the first area covered by the first PCF to a second area covered by a second PCF.

17. Apparatus for use in managing data interconnections in a mobile communications network having multiple packet control function entities (PCFs) and multiple packet data serving nodes (PDSNs), wherein each PCF and PDSN communicates signaling messages according to a mobile signaling protocol, the apparatus comprising:
a means for receiving information for a Mobile Subscriber (MS);
a means for associating the MS with a selected one of the PDSNs when the MS is in a first area covered by a first PCF; and
a means for associating the MS with the same selected one of the PDSNs, based on a selection made by one of the PDSNs, when the MS moves from the first area covered by the first PCF to a second area covered by a second PCF.

18. The method of claim 11, wherein, if the determined one of the PDSNs is the first PDSN, the method further comprises accepting the connection request by the first PDSN.

19. The method of claim 10, further comprising
dynamically repartitioning the key space associated with the PDSNs.

* * * * *